Feb. 3, 1959  E. M. ZACHARIAS, JR  2,871,957
CULTIVATOR ATTACHMENTS
Filed Dec. 5, 1956  3 Sheets-Sheet 1

INVENTOR
ELLIS MARK ZACHARIAS, Jr.
BY Ogle R. Singleton
ATTORNEY

Feb. 3, 1959
E. M. ZACHARIAS, JR
2,871,957
CULTIVATOR ATTACHMENTS
Filed Dec. 5, 1956
3 Sheets-Sheet 2
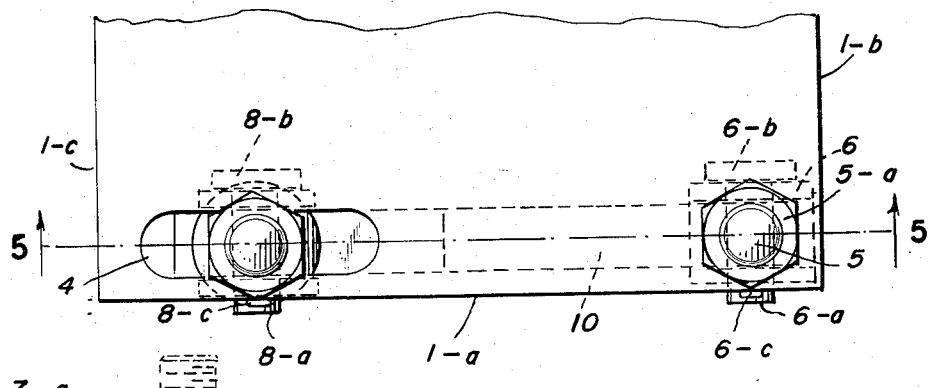
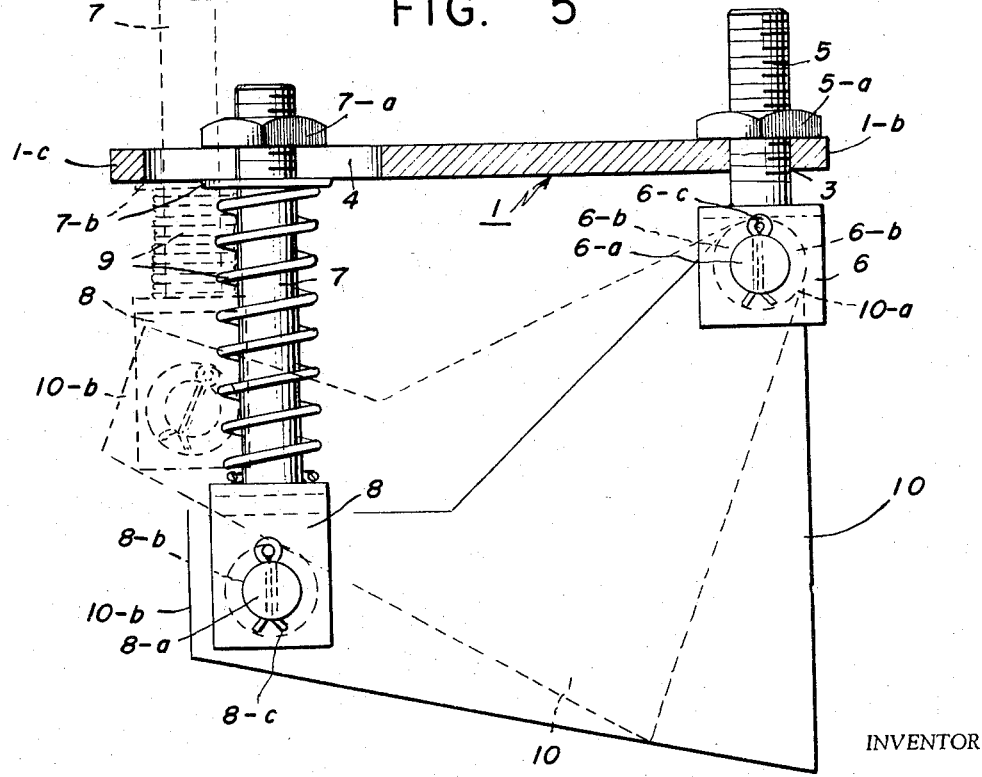
INVENTOR
ELLIS MARK ZACHARIAS, Jr.
BY *Ogle P. Singleton*
ATTORNEY Feb. 3, 1959 E. M. ZACHARIAS, JR 2,871,957
CULTIVATOR ATTACHMENTS Filed Dec. 5, 1956 3 Sheets-Sheet 3

INVENTOR
ELLIS MARK ZACHARIAS, Jr.

BY Ogle R. Singleton

ATTORNEY

United States Patent Office

2,871,957
Patented Feb. 3, 1959

2,871,957

CULTIVATOR ATTACHMENTS

Ellis Mark Zacharias, Jr., Livingston, N. J.

Application December 5, 1956, Serial No. 626,334

1 Claim. (Cl. 172—96)

My invention consists in a new and useful improvement in cultivator attachments and is designed to provide a device for cultivation of soil used for lawns or gardens, which may be readily applied to a conventional rotary power mower. The particularly novel and useful features of my improved device are that it can be designed to be applied to the mower either with or without its cutter blade; that it has rotating cultivator blades for producing circular furrows in the soil which are caused to overlap as the mower is moved over the soil, thereby effectively cultivating the soil; that the blades are vertically adjustable to determine the depth of cultivation, and horizontally adjustable to determine the diameter of the circular furrow; and that the blades are so pivotally and resiliently biased as to provide relief from undue pressure thereon and prevent excessive torques on the rotating shaft and render impossible undue loads on the motor of the mower.

I illustrate in the drawings and hereinafter fully describe two specific embodiments of my invention designed for use with and without the rotary cutter blade of the mower, respectively.

It is to be distinctly understood that I do not consider my invention to be limited to said two specific embodiments, and refer for its scope to the claim appended hereto.

In the drawings:

Fig. 4 is an enlarged, fragmentary top plan of the attachment.

Fig. 5 is a vertical section on the line 5—5 of Fig. 4, in the direction of the arrows.

Figure 1:
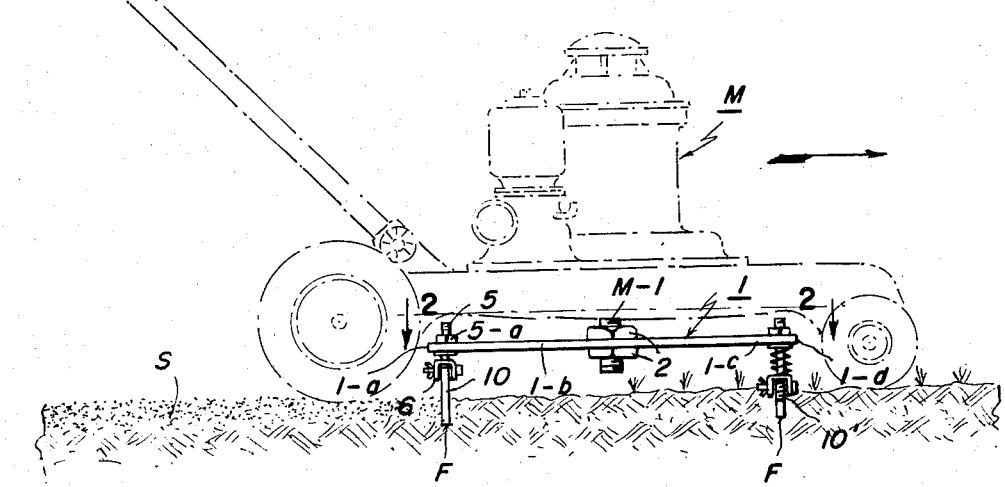
Fig. 1 is a side elevation of my improved cultivator attachment mounted on the rotary power mower shown in broken lines, a portion of which is broken away.
Figure 2:
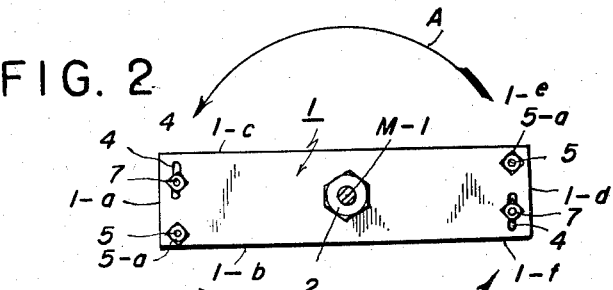
Fig. 2 is a horizontal section on the line 2—2 of Fig. 1, in the direction of the arrows.

As shown in Figs. 1 to 5 of the drawings, the mower M has a vertical driving shaft M–1 to carry the cutting blade which has been removed. A suitable bar 1 replacing the cutting blade is removably mounted on the shaft M–1 by any suitable means, such as nuts 2. This bar 1 has adjacent its end 1–a an internally threaded bore 3 adjacent the leading edge 1–b of the portion of the bar 1 to the left of the shaft M–1 (Figs. 1 and 2), relative to its direction of rotation indicated by arrows A, counter-clockwise as shown in Fig. 2. The bar 1 has a transverse slot 4 adjacent the end 1–a and the trailing edge 1–c of the portion of the bar 1 to the left of the shaft M–1 (Figs. 1 and 2). It will be noted that the bore 3 lies on the longitudinal axis of the slot 4. A forward support pin 5 is threaded in the bore 3 and is provided on its lower end with a yoke 6. The pin 5 has a suitable lock nut 5–a for fixing the pin 5 in adjusted position relative the bar 1. A rear support pin 7 passes loosely through the slot 4 and has on its upper end a nut 7–a bearing on the top of the bar 1. The pin 7 has on its lower end a yoke 8. An expansion spring 9 is coiled about the pin 7 and bears between the yoke 8 and a washer 7–b about the pin 7 under the bar 1, thereby biasing the pin 7 downwardly.

A cultivator blade 10 has its upper, forward end 10–a pivotally mounted in the yoke 6 by a pintle 6–a having a head 6–b on one end and a cotter-pin 6–c on the other end. The blade 10 has a rearwardly extending tail 10–b which is pivotally mounted in the yoke 8 by a pintle 8–a having a head 8–b on one end and a cotter-pin 8–c on the other end.

As clearly shown in Figs. 1 and 2, the bar 1 carries a second cultivator blade 10' adjacent its end 1–d. This blade 10' is mounted on the bar 1 by structure of the same character as above described for mounting the blade 10. The blade 10' is disposed on the bar 1 reversely to the disposition of the blade 10, so that the forward end of blade 10' is disposed toward the leading edge 1–e of the portion of the bar 1 to the right of the shaft M–1 (Figs. 1 and 2) and the rear end of the blade 10' is disposed toward the trailing edge 1–f of the portion of the bar 1 to the right of the shaft M–1 (Figs. 1 and 2).

It is to be noted (Figs. 1 and 2) that the two blades 10 and 10' are symmetrically disposed on the bar 1 relative the shaft M–1.

Figure 6:
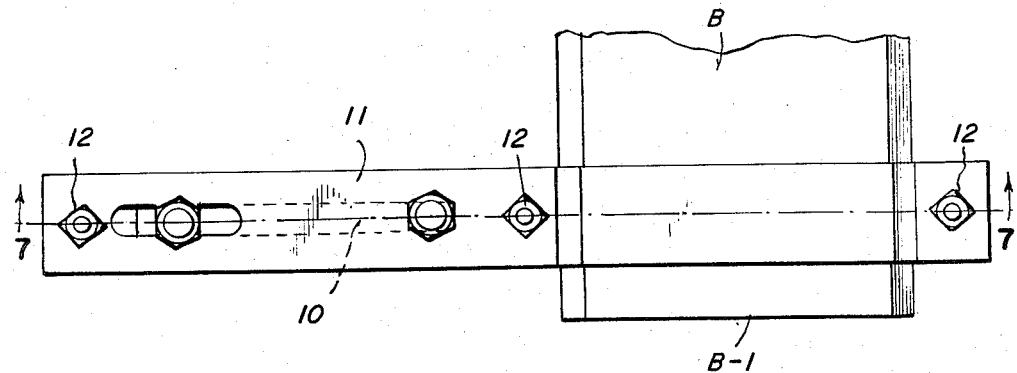
Fig. 6 is a fragmentary top plan of the modified form of my device.
Figure 7:
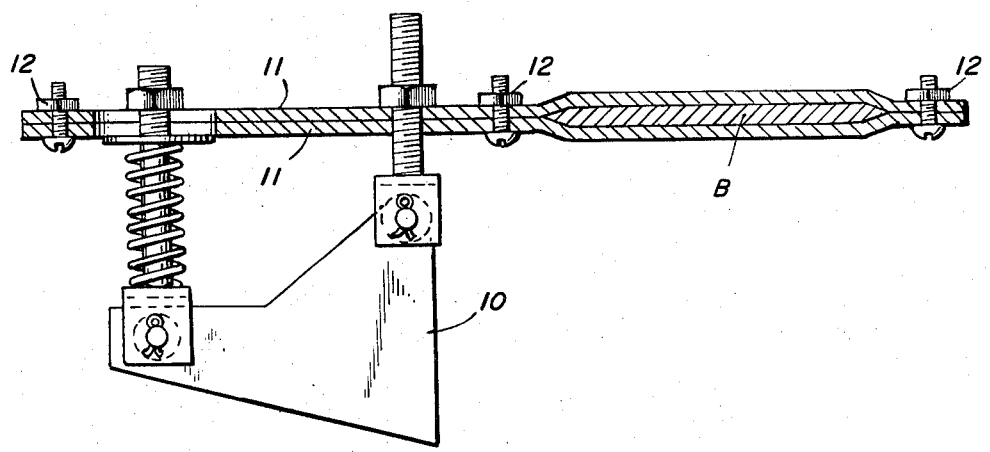
Fig. 7 is a vertical section on the line 7—7 of Fig. 6, in the direction of the arrows.

The modified form of my improved attachment is illustrated in Figs. 6 and 7 of the drawings. This form of attachment obviates removal of the cutting blade, being mounted thereon. I provide a pair of plates 11 which are suitably configured to enclose the blade B and be clamped normal to the blade B by suitable bolts and nuts 12. The cultivator blade 10 is mounted on these plates 11 by structure of the same character as above described. It is to be understood that the plates 11 are disposed adjacent one of the ends B–1 of the blade B, and that a second pair of plates (not shown) carrying a second cultivator blade (not shown) is disposed adjacent the other end of the blade B.

Figure 3:
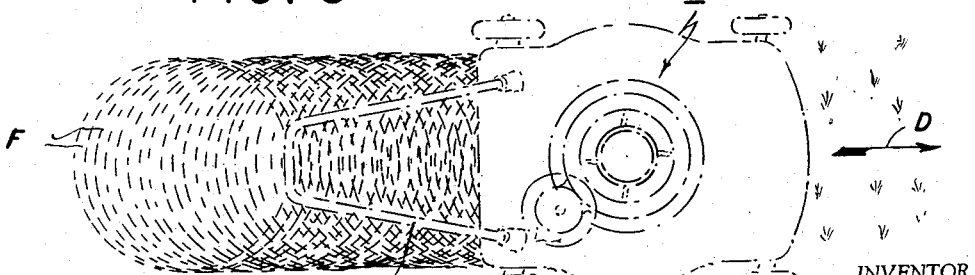
Fig. 3 is a top plan of the mower, illustrating the cultivation of the soil effected by the attachment.

I will now describe the operation of my improved cultivator attachment. As shown in Fig. 1, when the attachment has been mounted on the driving shaft M–1 and power is applied thereto, the blades 10 and 10' are driven by rotation of the bar 1 and thereby produce, in the soil S, a circular furrow F (Fig. 3). It is obvious that as the mower M is moved by the handle H in the direction of the arrow D, a series of overlapping furrows F will be produced, thus effectively cultivating the soil S.

The diameter of the circular furrow F can be determined by the distance of the blades 10 and 10' from the axis of the shaft M–1 and this distance can be determined either by the use of a plurality of bars 1 of different lengths or by providing a bar composed of three relatively adjustable parts. The depth of the furrow F can be determined either by adjustment of the bar relative the shaft M–1 or by adjustment of the pins 5 relative to the bar 1.

It is obvious that the pivotal mounting of the blades 10 and 10', with the mechanism for resiliently biasing them into operating position allows relief from undue pressure on the blades caused by obstructions in their path, such as stones. Also this novel form of mounting provides for automatic adjustment of the blades to reduce the cultivating depth when necessary, thus automatically preventing excessive torques on the shaft M–1 and the load on the motor of the mower.

Having described my invention, what I claim is:

In a cultivator attachment for a rotary power lawn mower having a vertical driving shaft, for cultivating soil over which the mower is moved, the combination of a bar adapted to be removably and adjustably mounted on the shaft for rotation thereby, and having an internally threaded bore adjacent one of its ends and its leading edge, and a transverse slot adjacent said end and its trailing edge; a pin threaded in said bore and having a yoke on its lower end; a second pin passed loosely through said slot and having a nut threaded thereon above said bar, a washer thereon below said bar, and a yoke on its lower end; an expansion spring coiled about said second pin between said washer and said yoke; and a cultivator blade having the upper end of its leading edge pivotally mounted in the yoke of the first pin and having a tail pivotally mounted in the yoke of the second pin.

References Cited in the file of this patent

UNITED STATES PATENTS

| | | |
|---|---|---|
| 2,513,685 | Smith et al. | July 4, 1950 |
| 2,545,173 | Shaw | Mar. 13, 1951 |
| 2,615,246 | Littig | Oct. 28, 1952 |
| 2,706,441 | Caldwell et al. | Apr. 19, 1955 |
| 2,720,071 | Watanabe | Oct. 11, 1955 |

FOREIGN PATENTS

| | | |
|---|---|---|
| 1,120,674 | France | July 10, 1956 |